(12) United States Patent
Schmidt et al.

(10) Patent No.: US 7,451,324 B2
(45) Date of Patent: Nov. 11, 2008

(54) SECURE EXECUTION MODE EXCEPTIONS

(75) Inventors: Rodney W. Schmidt, Dripping Springs, TX (US); Brian C. Barnes, Round Rock, TX (US); Geoffrey S. Strongin, Austin, TX (US); David S. Christie, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 1249 days.

(21) Appl. No.: 10/161,500

(22) Filed: May 31, 2002

(65) Prior Publication Data

US 2003/0226022 A1    Dec. 4, 2003

(51) Int. Cl.
*G06F 21/22* (2006.01)
(52) U.S. Cl. .................................. 713/187; 713/189
(58) Field of Classification Search ................ 713/189; 714/25
See application file for complete search history.

(56) References Cited

U.S. PATENT DOCUMENTS

| 5,369,770 | A | 11/1994 | Thomason et al. | 395/725 |
|---|---|---|---|---|
| 5,535,397 | A | 7/1996 | Durante et al. | 395/740 |
| 5,684,948 | A | 11/1997 | Johnson et al. | 395/186 |
| 5,937,186 | A | 8/1999 | Horiguchi et al. | 39/591 |
| 6,330,666 | B1 * | 12/2001 | Wise et al. | 712/300 |
| 6,697,959 | B2 * | 2/2004 | Andress et al. | 714/10 |
| 6,725,362 | B2 * | 4/2004 | Kahn et al. | 712/225 |
| 6,792,499 | B1 * | 9/2004 | Eldredge | 711/5 |
| 6,957,332 | B1 * | 10/2005 | Ellison et al. | 713/164 |

OTHER PUBLICATIONS

International PCT Search Report PCT/US 02/40219 dated Mar. 27, 2003.

* cited by examiner

*Primary Examiner*—Ayaz Sheikh
*Assistant Examiner*—Saoussen Besrour
(74) *Attorney, Agent, or Firm*—Williams, Morgan & Amerson

(57) ABSTRACT

A method and system for handling a security exception. The method includes creating a security exception stack frame in secure memory at a base address. The method also includes writing a faulting code sequence address and one or more register values into the security exception stack frame, and executing a plurality of security exception instructions.

13 Claims, 13 Drawing Sheets

ERROR CODE FORMAT: 1000

SECURE EXECUTION MODE EXCEPTIONS

BACKGROUND OF THE INVENTION

1. Field of the Invention

This invention relates generally to computer systems and, more particularly, to methods that provide security for a computing system.

2. Description of the Related Art

FIG. 1 is a diagram of an exception stack frame 100 produced by an x86 processor, such as when running the Windows® operating system (Microsoft Corp., Redmond, Wash.). On entry to an exception handler, all registers of the application program in which the exception occurred (i.e., the "faulting application") are preserved except the code segment (CS), instruction pointer (EIP), stack segment (SS), stack pointer (ESP) registers, and EFLAGS. The contents of these registers are made available in the exception stack frame 100.

The exception stack frame 100 begins at segmented address SS:ESP. The error code resides in the exception stack frame 100 at segmented address SS:ESP+00h. The contents of the instruction pointer (EIP) register of the faulting application resides in the exception stack frame 100 at segmented address SS:ESP+04h. The contents of the code segment (CS) register of the faulting application resides in the exception stack frame 100 at segmented address SS:ESP+08h. The contents of the flags (EFLAGS) register of the faulting application resides in the exception stack frame 100 at segmented address SS:ESP+0Ch. The contents of the stack pointer (ESP) register of the faulting application resides in the exception stack frame 100 at segmented address SS:ESP+10h. The contents of the stack segment (SS) register of the faulting application resides in the exception stack frame 100 at segmented address SS:ESP+14h. Note that the ESP and SS values appear in the exception stack frame 100 if the associated control transfer to the exception handler involves a change of privilege level.

The contents of the instruction pointer (EIP) register of the faulting application, at segmented address SS:ESP+04h, points to the instruction in the faulting application that generated the exception. The contents of the stack pointer (ESP) register of the faulting application, at segmented address SS:ESP+10h, is the address of (i.e., points to) the faulting applications' stack frame at fault time.

The error code for segment-related exceptions is very similar to a protected mode selector. The highest-ordered 13 bits (bits 15:3) are the selector index, and bit 2 is the table index. However, instead of a requestor privilege level (RPL), bits 0 and 1 have the following meeting: bit 0 (EXT) is set if the fault was caused by an event external to the program, and bit 1 (IDT) is set if the selector index refers to a gate descriptor in the IDT.

FIG. 2 is a diagram of a SYSCALL/SYSRET target address register (STAR) 200 used in x86 processors manufactured by Advanced Micro Devices, Inc. The SYSCALL/SYSRET target address register (STAR) 200 includes a "SYSRET CS Selector and SS Selector Base" field, a "SYSCALL CS Selector and SS Selector Base" field, and a "Target EIP Address" field.

At some point prior to execution of a SYSCALL instruction, the operating system writes values for the code segment (CS) of the appropriate system service code to the SYSCALL CS Selector and SS Selector Base field of the SYSCALL/SYSRET target address register (STAR) 200. The operating system also writes the address of the first instruction within the system service code to be executed into the Target EIP Address field of the SYSCALL/SYSRET target address register (STAR) 200. The STAR register is configured at system boot. The Target EIP address may point to a fixed system service region in the operating system kernel.

During execution of a SYSCALL instruction, the contents of the SYSCALL CS Selector and SS Selector Base field is copied into the CS register. The contents of the SYSCALL CS Selector and SS Selector Base field, plus the value '1000b', is copied into the SS register. This effectively increments the index field of the CS selector such that a resultant SS selector points to the next descriptor in a descriptor table, after the CS descriptor. The contents of the Target EIP Address field are copied into the instruction pointer (EIP) register, and specify an address of a first instruction to be executed.

At some point prior to execution of a SYSRET instruction corresponding to the SYSCALL instruction, the operating system writes values for the code segment (CS) of the calling code to the SYSRET CS Selector and SS Selector Base field of the SYSCALL/SYSRET target address register (STAR) 200. The SYSRET instruction obtains the return EIP address from the ECX register.

SUMMARY OF THE INVENTION

According to one aspect of the present invention, a method is provided. The method includes creating a security exception stack frame in secure memory at a base address. The method also includes writing a faulting code sequence address and one or more register values into the security exception stack frame, and executing a plurality of security exception instructions.

According to another aspect of the present invention, a system is provided. The system includes one or more security check units configured to monitor requests and a plurality of secure storage locations. The system also includes a processor configured to execute a security kernel. The one or more security check units is further configured to generate a security exception in response to one of the requests. The processor is further configured to create a security exception stack frame with in secure memory at a base address and to write a faulting code sequence address and one or more register values into the security exception stack frame. The security kernel is configured to execute a plurality of security exception instructions.

According to yet another aspect of the present invention, a machine-readable medium is provided. The machine-readable medium is configured with instructions which, when executed in a configure computer system, carry out the method.

According to still yet another aspect of the present invention, another method is provided. This method includes receiving a security exception and creating a security exception stack frame within secure memory at a base address in response to receiving the security exception. This method also includes writing a faulting code sequence address and one or more register values into the security exception stack frame and executing a plurality of security exception instructions.

BRIEF DESCRIPTION OF THE DRAWINGS

The invention may be understood by reference to the following description taken in conjunction with the accompanying drawings, in which like reference numerals identify similar elements, and in which:

FIG. 7A is a diagram of one embodiment of the MEM SCU, according to one aspect of the present invention, while

Figure 1:
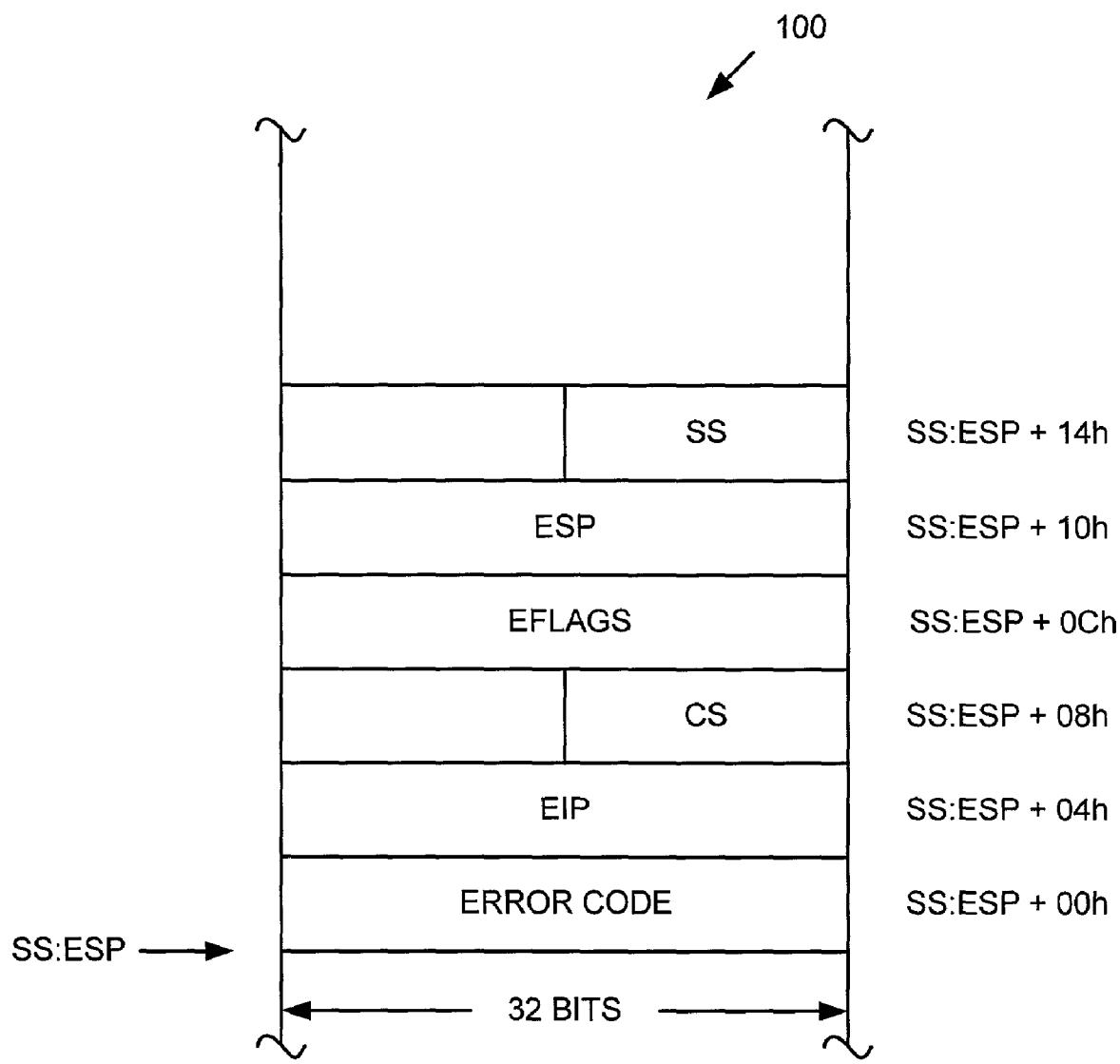
FIG. 1 is a diagram of a an exception stack frame produced by an x86 processor, such as when running the Windows® operating system.
Figure 2:
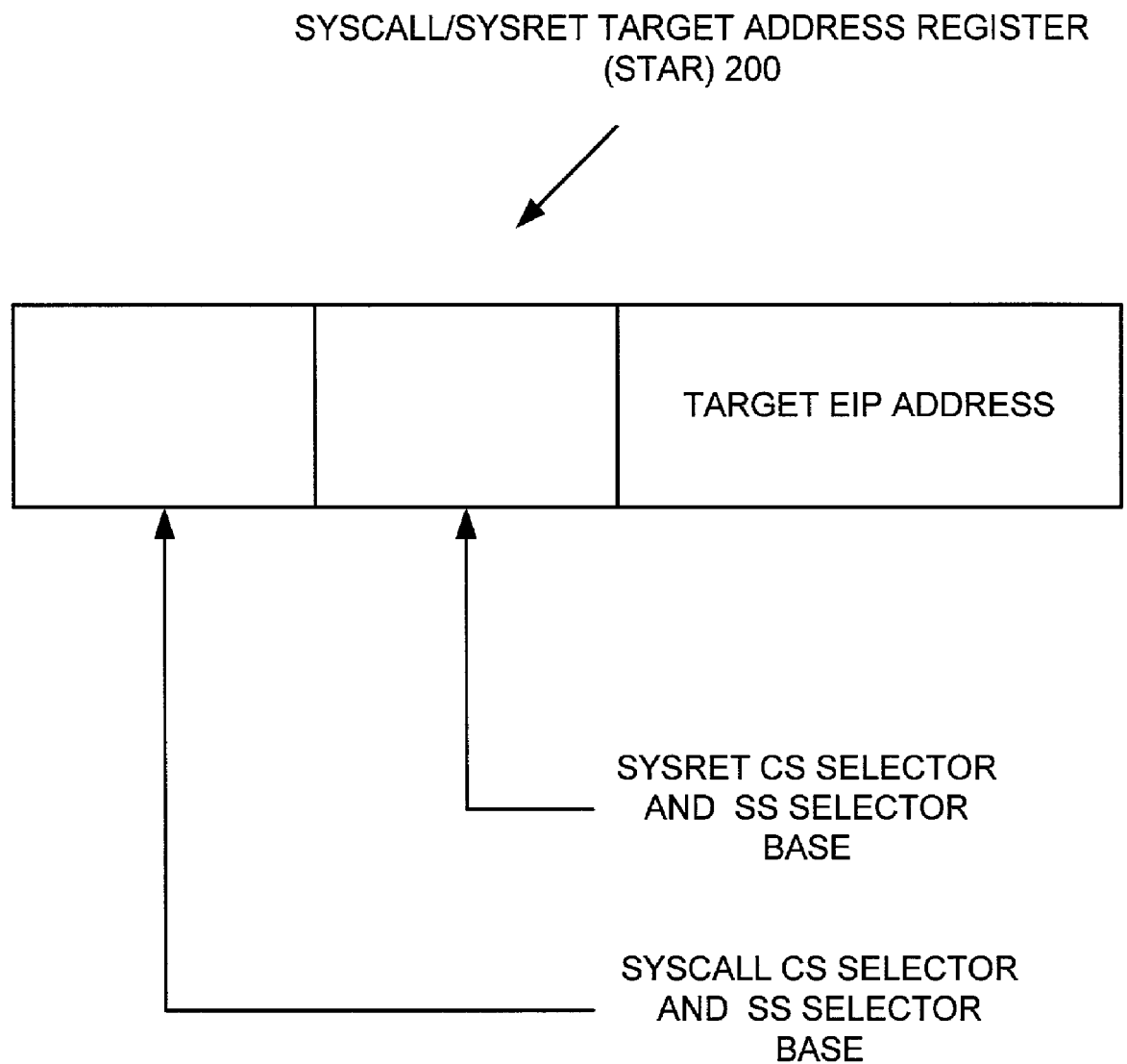
FIG. 2 is a diagram of a SYSCALL/SYSRET target address register.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 3:
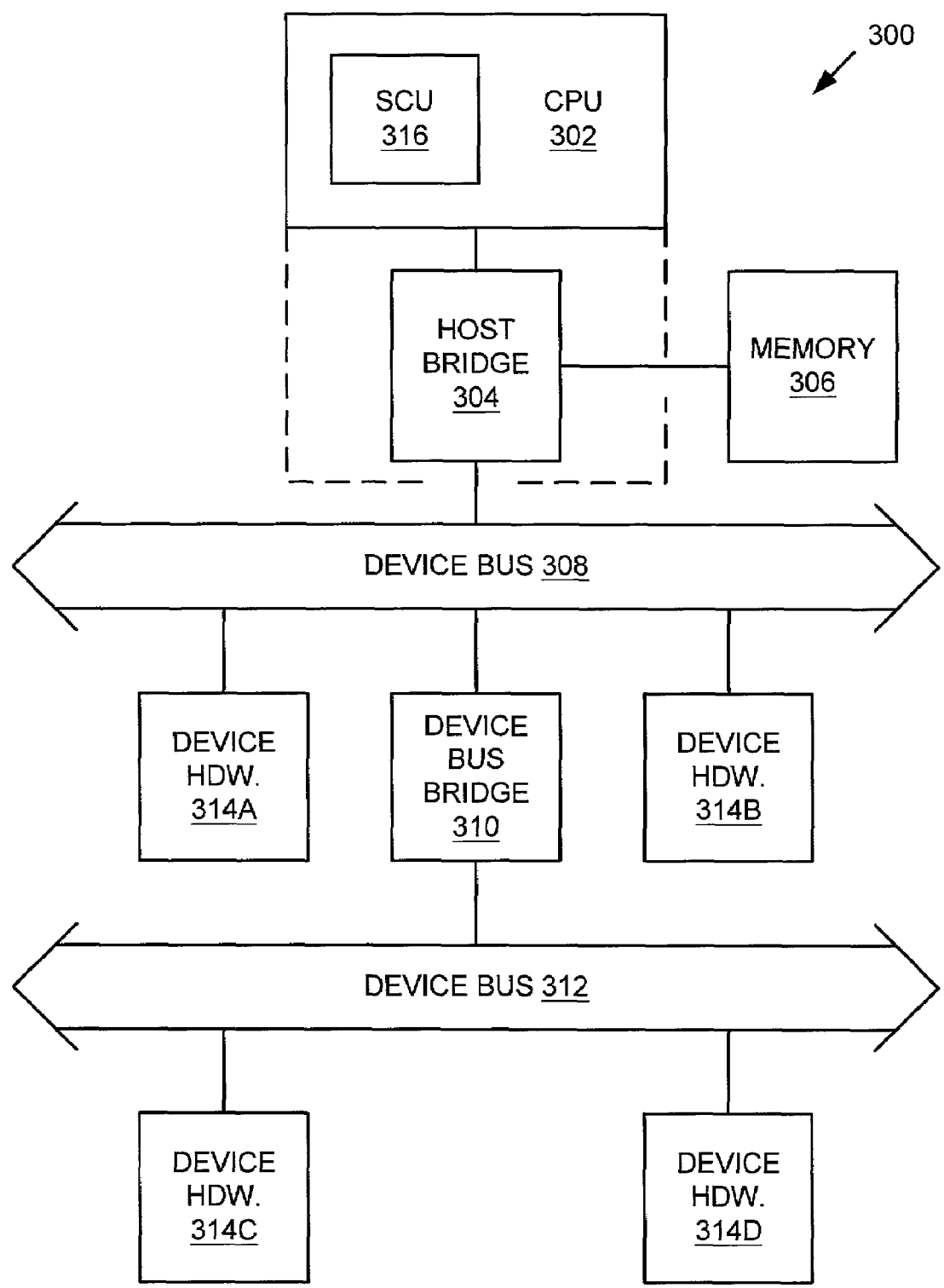
FIG. 3 is a block diagram of one embodiment of a computer system that may be utilized in accordance with one aspect of the present invention.

FIG. 3 is a diagram of one embodiment of a computer system 300 including a CPU 302, a system or "host" bridge 304, a memory 306, a first device bus 308 (e.g., a peripheral component interconnect or PCI bus), a device bus bridge 310, a second device bus 312 (e.g., an industry standard architecture or ISA bus), and four device hardware units 314A-314D. The host bridge 304 is coupled to the CPU 302, the memory 306, and the first device bus 308. The host bridge 304 translates signals between the CPU 302 and the first device bus 308, and operably couples the memory 306 to the CPU 302 and to the first device bus 308. The device bus bridge 310 is coupled between the first device bus 308 and the second device bus 312, and translates signals between the first device bus 308 and the second device bus 312. The CPU 302 includes a security check unit (SCU) 316.

As will be described in detail below, the SCU 316 may be embodied in one or more specialized SCUs 316, such as a memory (MEM) SCU 316A, a control register (REG) SCU 316B, and an input/output (I/O) SCU 316C. The MEM SCU 316A protects the memory 306 from unauthorized accesses generated by CPU 302 (i.e., "software-initiated accesses") and also various hardware-initiated accesses. The REG SCU 316B protects control registers (e.g., control registers 508 and/or SEM registers 510) from unauthorized accesses. The I/O SCU 316C protects I/O space (e.g., I/O ports) from unauthorized accesses.

In the embodiment of FIG. 3, the device hardware units 314A and 314B are coupled to the first device bus 308, and the device hardware units 314C and 314D are coupled to the second device bus 312. One or more of the device hardware units 314A-314D may be, for example, storage devices (e.g., hard disk drives, floppy drives, and CD-ROM drives), communication devices (e.g., modems and network adapters), or input/output devices (e.g., video devices, audio devices, and printers). It is noted that in other embodiments, the host bridge 304 may be part of the CPU 302 as indicated in FIG. 3.

Figure 4:
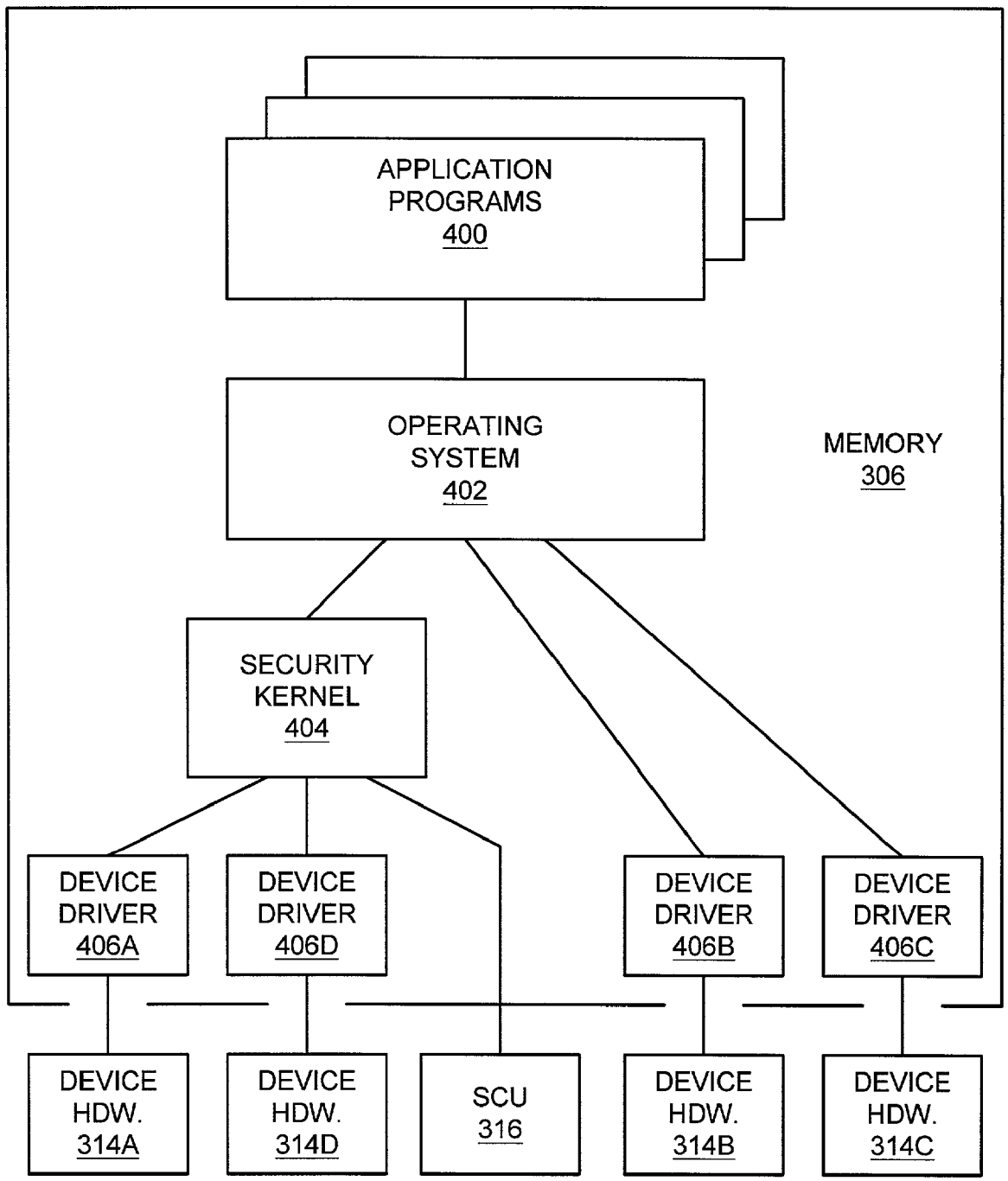
FIG. 4 is a diagram illustrating some relationships between various hardware and software components of the computer system embodiments, according to one aspect of the present invention.

FIG. 4 is a diagram illustrating relationships between various hardware and software components of the computer system 300 of FIG. 3. In the embodiment of FIG. 4, multiple application programs 400, an operating system 402, a security kernel 404, and device drivers 406A-406D are stored in the memory 306. The application programs 400, the operating system 402, the security kernel 404, and the device drivers 406A-406D include instructions executed by the CPU 302. The operating system 402 provides a user interface and software "platform" on top of which the application programs 400 run. The operating system 402 may also provide, for example, basic support functions, including file system management, process management, and I/O control.

The operating system 402 may also provide basic security functions. For example, the CPU 302 (FIG. 3) may be an x86 processor that executes instructions of the x86 instruction set. In this situation, the CPU 302 may include specialized hardware elements to provide both virtual memory and physical memory protection features in the protected mode as described above. The operating system 402 may be, for example, one of the Windows® family of operating systems (Microsoft Corp., Redmond, Wash.) that operates the CPU 302 in the protected mode, and uses the specialized hardware elements of the CPU 302 to provide both virtual memory and memory protection in the protected mode. The security kernel 404 provides additional security functions above the security functions provided by the operating system 402, e.g., to protect data stored in the memory 306 from unauthorized access.

In the embodiment of FIG. 4, the device drivers 406A-406D are operationally associated with, and coupled to, the respective corresponding device hardware units 314A-314D. The device hardware units 314A and 314D may be, for example, "secure" devices, and the corresponding device drivers 406A and 406D may be "secure" device drivers. The security kernel 404 is coupled between the operating system 402 and the secure device drivers 406A and 406D, and may monitor all accesses by the application programs 400 and the operating system 402 to secure the device drivers 406A and 406D and the corresponding secure devices 314A and 314D. The security kernel 404 may prevent unauthorized accesses to the secure device drivers 406A and 406D and the corresponding secure devices 314A and 314D by the application programs 400 and the operating system 402. The device drivers 406B and 406C, on the other hand, may be "non-secure" device drivers, and the corresponding device hardware units 314B and 314C may be "non-secure" device hardware units. The device drivers 406B and 406C and the corresponding device hardware units 314B and 314C may be, for example, "legacy" device drivers and device hardware units.

It is noted that in other embodiments, the security kernel 404 may be part of the operating system 402. In yet other embodiments, the security kernel 404, the device drivers 406A and 406D, and/or the device drivers 406B and 406C may be part of the operating system 402. The security kernel 404 may also govern access to a secure application memory space and/or a secure program space. The SCU 316 is also operationally associated with the security kernel 404.

Figure 5A:
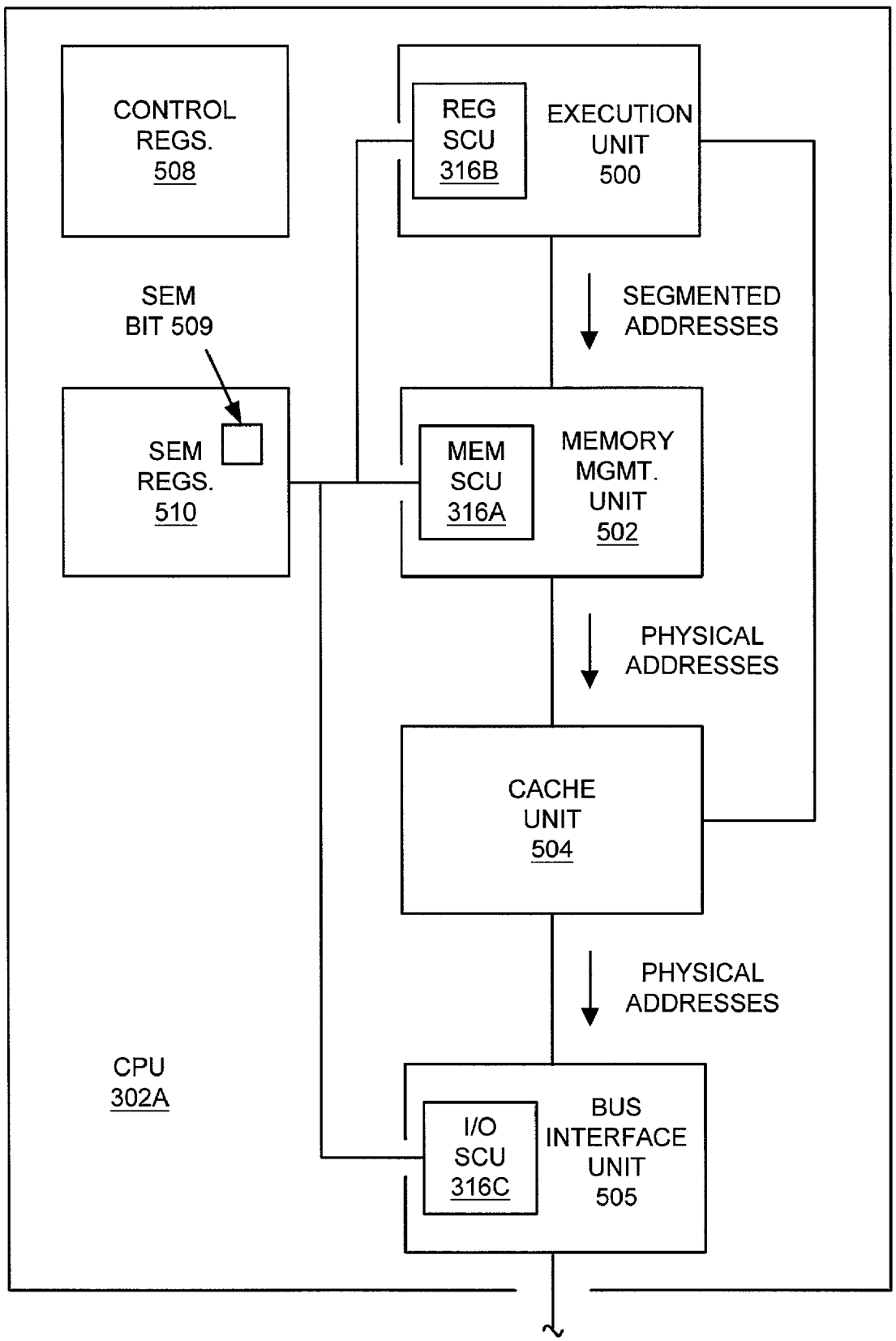
FIGS. 5A and 5B are diagrams of embodiments of CPUs, according to various aspects of the present invention.

FIG. 5A is a diagram of one embodiment of the CPU 302 of the computer system 300. In the embodiment of FIG. 5A, the CPU 302A includes an execution unit 500, a memory management unit (MMU) 502, a cache unit 504, a bus interface unit (BIU) 506, a set of control registers 508, and a set of secure execution mode (SEM) registers 510. The set of SEM registers 510 is used to implement a secure execution mode (SEM) within the computer system 300. The SEM registers 510 may be accessed (i.e., written to and/or read from) by the security kernel 404. The MEM SCU 316A is shown located within the MMU 502. The REG SCU 316B is shown located within the execution unit 500. The I/O SCU 316C is shown located within the BIU 506. Other locations within the CPU are also contemplated. The operations of the MEM SCU 316A, the REG SCU 316B, and the I/O SCU 316C are governed by the contents of the set of SEM registers 510.

In the embodiment of FIG. 5A, the set of SEM registers 510 includes a secure execution mode (SEM) bit. The computer system 300 of FIG. 3 may, for example, operate in the secure execution mode (SEM) when: (i) the CPU 302 is an x86 processor operating in the x86 protected mode, (ii) memory paging is enabled, and (iii) the SEM bit is set to '1'. Other methods of indicating operation in SEM and other operations of SEM may also be used.

In general, the contents of the set of control registers 508 are used to govern operation of the CPU 302. Accordingly, the contents of the set of control registers 508 are used to govern operation of the execution unit 500, the MMU 502, the cache unit 504, and/or the BIU 506. The set of control registers 508 may include, for example, the multiple control registers of the x86 processor architecture.

The execution unit 500 of the CPU 302 fetches instructions (e.g., x86 instructions) and data, executes the fetched instructions, and generates signals (e.g., address, data, and control signals) during instruction execution. The execution unit 500 is coupled to the cache unit 504, and may receive instructions from the memory 306 via the cache unit 504 and the BIU 506.

The memory 306 of the computer system 300 includes multiple memory locations, each having a unique physical address. When operating in protected mode with paging enabled, an address space of the CPU 302 is divided into multiple blocks called page frames or "pages." In other embodiments, the memory may be divided into or accessed through memory regions defined differently. Typically, only data corresponding to a portion of the pages is stored within the memory 306 at any given time.

In the embodiment of FIG. 5A, address signals generated by the execution unit 500 during instruction execution represent segmented (i.e., "logical") addresses. The MMU 502 translates the segmented addresses generated by the execution unit 500 to corresponding physical addresses of the memory 306. The MMU 502 provides the physical addresses to the cache unit 504. The cache unit 504 is a relatively small storage unit used to store instructions and data recently fetched by the execution unit 500. The BIU 506 is coupled between the cache unit 504 and the host bridge 304, and is used to fetch instructions and data not present in the cache unit 504 from the memory 306 via the host bridge 304.

Note that the use of a cache unit 504 is optional but may advantageously provide for greater operational efficiency of the CPU 302. Note also that the execution unit 500 may execute standard instructions, secure instructions, and/or microcode, depending on the implementation. In one embodiment, microcode executing in the processor 302 is hardware and not software.

When the computer system 300 operates in the SEM, the security kernel 404 generates and maintains one or more security attribute data structures (e.g., tables) in protected portions of the memory 306. Each memory page has a corresponding security context identification (SCID) value, and the corresponding SCID value may be stored within the security attribute data structures. The MMU 502 uses an address generated during instruction execution (e.g., a physical address) to access the one or more security attribute data structures to obtain the SCIDs of corresponding memory pages. In general, the computer system 300 has n different security context identification (SCID) values, where n is an integer and $n \geq 1$.

When the computer system 300 operates in the SEM, various activities by software that violate security mechanisms will cause an SEM security exception. The SEM security exception may be dispatched through a pair of registers (e.g., model specific registers or MSRs) similar to the way x86 "SYSENTER" and "SYSEXIT" instructions operate. The pair of registers may be "security exception entry point" registers, and may define a branch target address for instruction execution when a SEM security exception occurs. The security exception entry point registers may define the code segment (CS), the instruction pointer (EIP, or the 64-bit version RIP), the stack segment (SS), and the stack pointer (ESP, or the 64-bit version RSP) values to be used on entry to a SEM security exception handler.

The execution unit 500 may push the previous SS, ESP/RSP, EFLAGS, CS, and EIP/RIP values onto a new stack to indicate where the exception occurred. In addition, execution unit 500 may push an error code onto the stack. It is noted that a normal return from interrupt (IRET) instruction may not be used as the previous SS and ESP/RSP values are always saved, and a stack switch is always accomplished, even if a change in CPL does not occur. Accordingly, a new instruction may be defined to accomplish a return from the SEM security exception handler (SMRET).

Figure 5B:
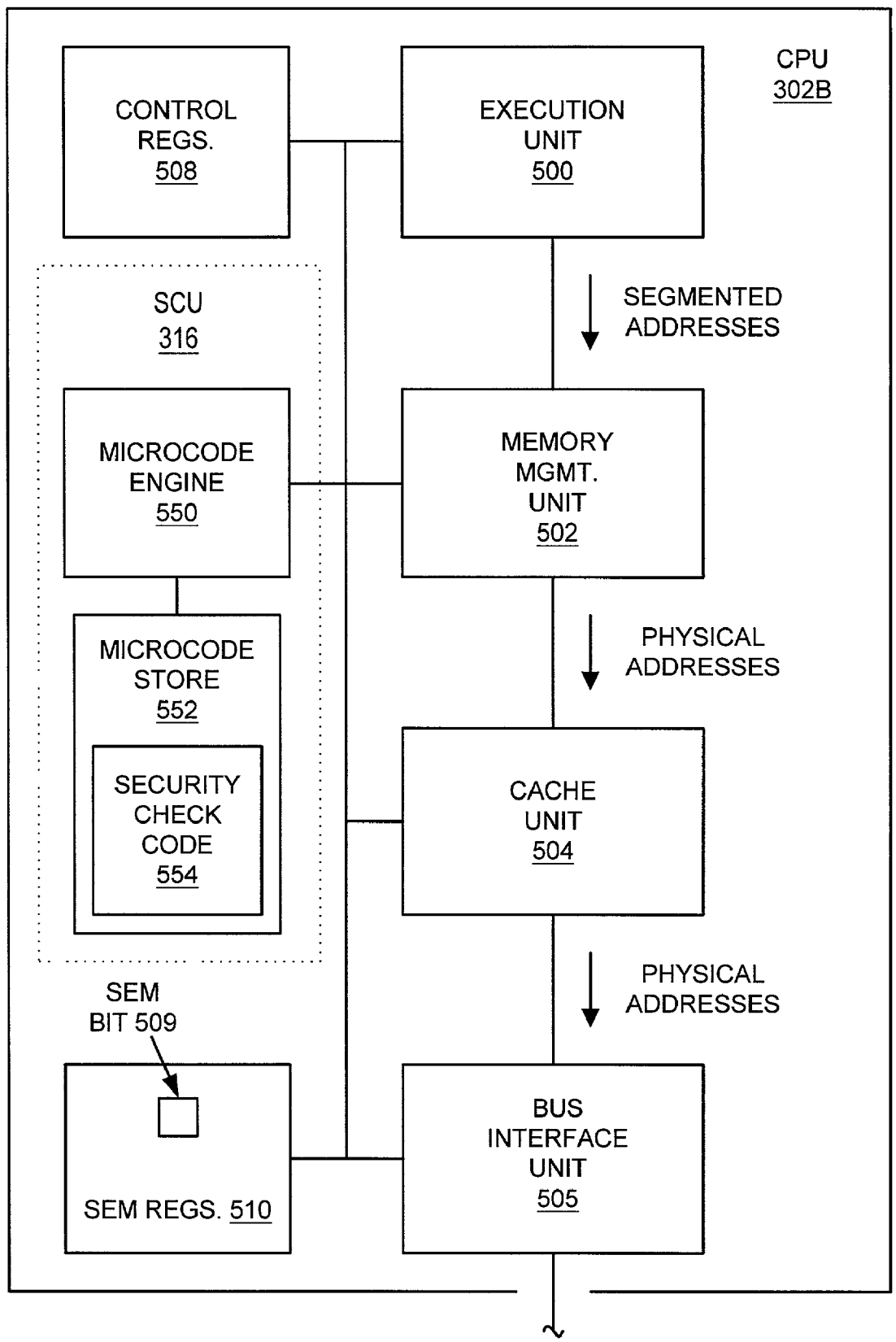

FIG. 5B is a diagram of an alternate embodiment of the CPU 302 of the computer system 300. In the embodiment of FIG. 5B, the CPU 302B includes the execution unit 500, the MMU 502, the cache unit 504, the BIU 505, the set of control registers 508, and the set of secure execution mode (SEM) registers 510 described above with respect to FIG. 5A. In addition, the CPU 302B includes a microcode engine 550 and a microcode store 552. The microcode engine 550 is coupled to the execution unit 500, the MMU 502, the cache unit 504, the BIU 505, the set of control registers 508, and the set of SEM registers 510. The microcode engine 550 executes microcode instructions stored in the microcode store 552, and produces signals which control the operations of the execution unit 500, the MMU 502, the cache unit 504, and the BIU 505, dependent upon the microcode instructions, the contents of the set of control registers 508, and the contents of the set of SEM registers 510. In the embodiment of FIG. 5B, the microcode engine 550 executing the microcode instructions stored in the microcode store 552 may replace one or more of the MEM SCU 316A, the REG SCU 316B, and the I/O SCU 316C. In an x86 embodiment, the microcode engine 550 may also assist the execution unit 500 in executing more complex instructions of the x86 instruction set.

In the embodiment of FIG. 5B, a portion of the microcode instructions stored in the microcode store 552 forms security check code 554. The security check code 554 may be executed when the computer system 300 is operating in the SEM, and an instruction has been forwarded to the execution unit 500 for execution. In essence, the execution of the microcode instructions of the security check code 554 cause the microcode engine 550 and various ones of the execution unit 500, the MMU 502, and the BIU 505 to perform the functions of SCU 316 described above.

For example, when an I/O instruction is forwarded to the execution unit 500 for execution, the execution unit 500 may signal the presence of the I/O instruction to the microcode engine 550. The microcode engine 550 may assert signals to the MMU 502 and the BIU 505. In response to a signal from the microcode engine 550, the MMU 502 may provide the security context identification (SCID) value of the memory page including the I/O instruction to the BIU 505. The execution unit 500 may provide the I/O port number accessed by the I/O instruction to the BIU 505.

In response to a signal from the microcode engine 550, the BIU 505 may use the security context identification (SCID) value and the received I/O port number to access an SEM I/O permission bitmap 800 (see FIG. 8), and may provide the corresponding bit from the SEM I/O permission bitmap 800 to the microcode engine 550. If the corresponding bit from the SEM I/O permission bitmap 800 is cleared to '0', the microcode engine 550 may continue to assist the execution unit 500 in completing the execution of the I/O instruction. If, on the other hand, the corresponding bit is set to '1', the microcode engine 550 may signal the execution unit 500 to stop executing the I/O instruction and to start executing instruction of the SEM exception handler.

Note also that the execution unit 500 may execute standard instructions, secure instructions, and/or microcode, depending on the implementation. Thus, in one embodiment, the execution unit 500 and the microcode engine 550 both execute microcode. In one embodiment, microcode executing in the processor 302 is considered a hardware action and not a software action.

Figure 6:
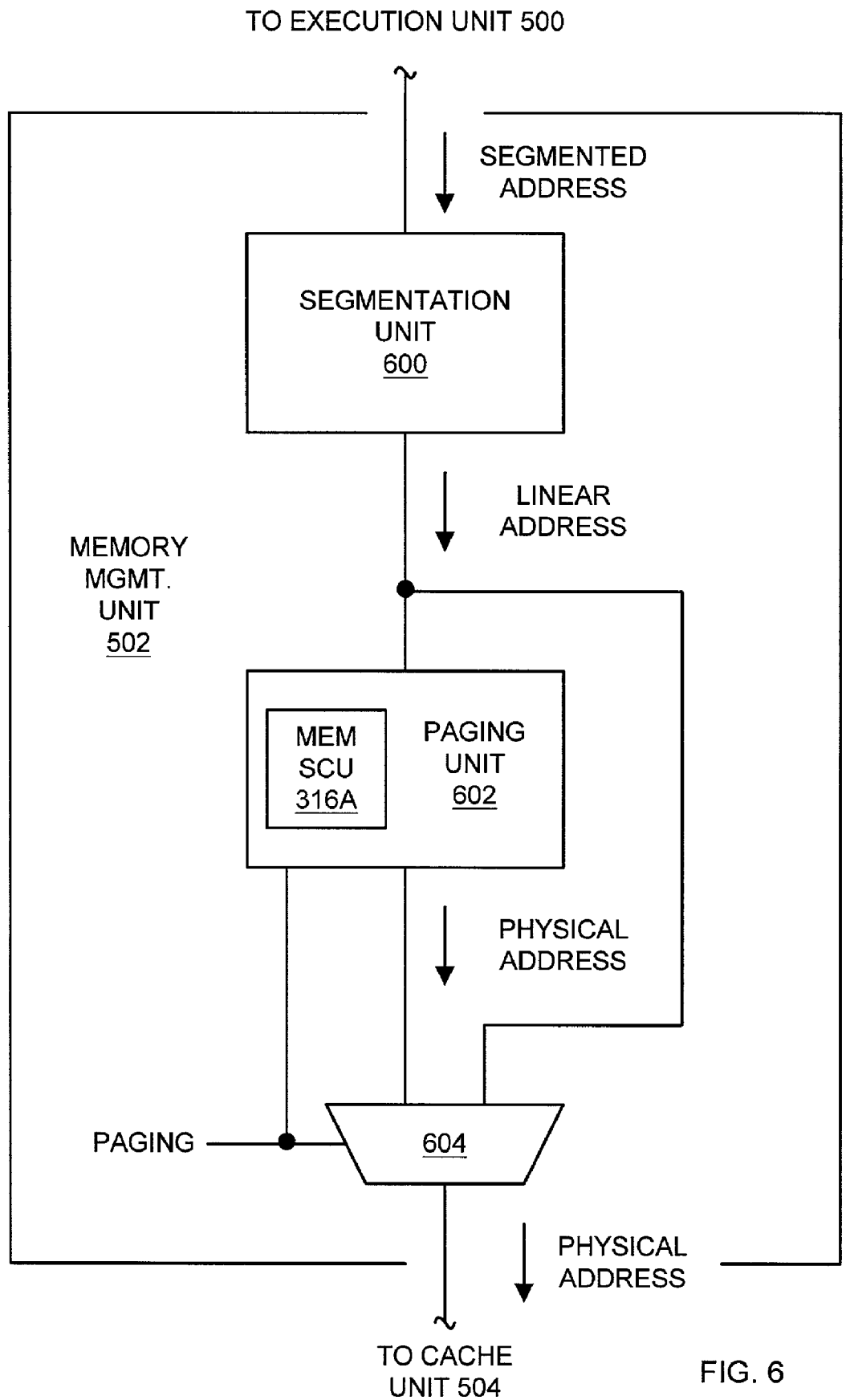
FIG. 6 is a diagram of one embodiment of a MMU including a paging unit having a memory security check unit (MEM SCU), according to one aspect of the present invention.

FIG. 6 is a diagram of one embodiment of the MMU 502, describing an x86 embodiment. In the embodiment of FIG. 6, the MMU 502 includes a segmentation unit 600, a paging unit 602, and selection logic 604 for selecting between outputs of the segmentation unit 600 and the paging unit 602 to produce a physical address. The paging unit 602, as shown, includes the MEM SCU 316A. As indicated in FIG. 6, the segmentation unit 600 receives a segmented address from the execution unit 500 and may use a well-know segmented-to-linear address translation mechanism of the x86 processor architecture to produce a corresponding linear address at an output. As indicated in FIG. 6, when enabled by a "PAGING" signal, the paging unit 602 receives the linear addresses produced by the segmentation unit 500 and produces corresponding physical addresses at an output. The PAGING signal may mirror the paging flag (PG) bit in a control register 0 (CR0) of the x86 processor architecture and of the set of control registers 508. When the PAGING signal is deasserted, memory paging is not enabled, and the selection logic 604 produces the linear address received from the segmentation unit 600 as the physical address.

When the PAGING signal is asserted, memory paging is enabled, and the paging unit 602 translates the linear address received from the segmentation unit 500 to a corresponding physical address using the linear-to-physical address translation mechanism of the x86 processor architecture. During the linear-to-physical address translation operation, the contents of the U/S bits of the selected page directory entry and the selected page table entry are logically ANDed determine if the access to a page frame is authorized. Similarly, the contents of the R/W bits of the selected page directory entry and the selected page table entry are logically ANDed to determine if the access to the page frame is authorized. If the logical combinations of the U/S and R/W bits indicate the access to the page frame is authorized, the paging unit 602 produces the physical address resulting from the linear-to-physical address translation operation. The selection logic 604 receives the physical address produced by the paging unit 602, produces the physical address received from the paging unit 602 as the physical address, and provides the physical address to the cache unit 504.

On the other hand, if the logical combinations of the U/S and R/W bits indicate the access to the page frame is not authorized, the paging unit 602 does not produce a physical address during the linear-to-physical address translation operation. Instead, the paging unit 602 asserts a page fault (PF) signal, and the MMU 502 forwards the PF signal to the execution unit 500. In response to the PF signal, the execution unit 500 may execute an exception handler routine, such as the SEM security exception handler and may ultimately halt the execution of one of the application programs 400 running when the PF signal was asserted.

In the embodiment of FIG. 6, the MEM SCU 316A is located within the paging unit 602 of the MMU 502. The paging unit 602 may also include a translation lookaside buffer (TLB) for storing a relatively small number of recently determined linear-to-physical address translations.

Figure 7A:
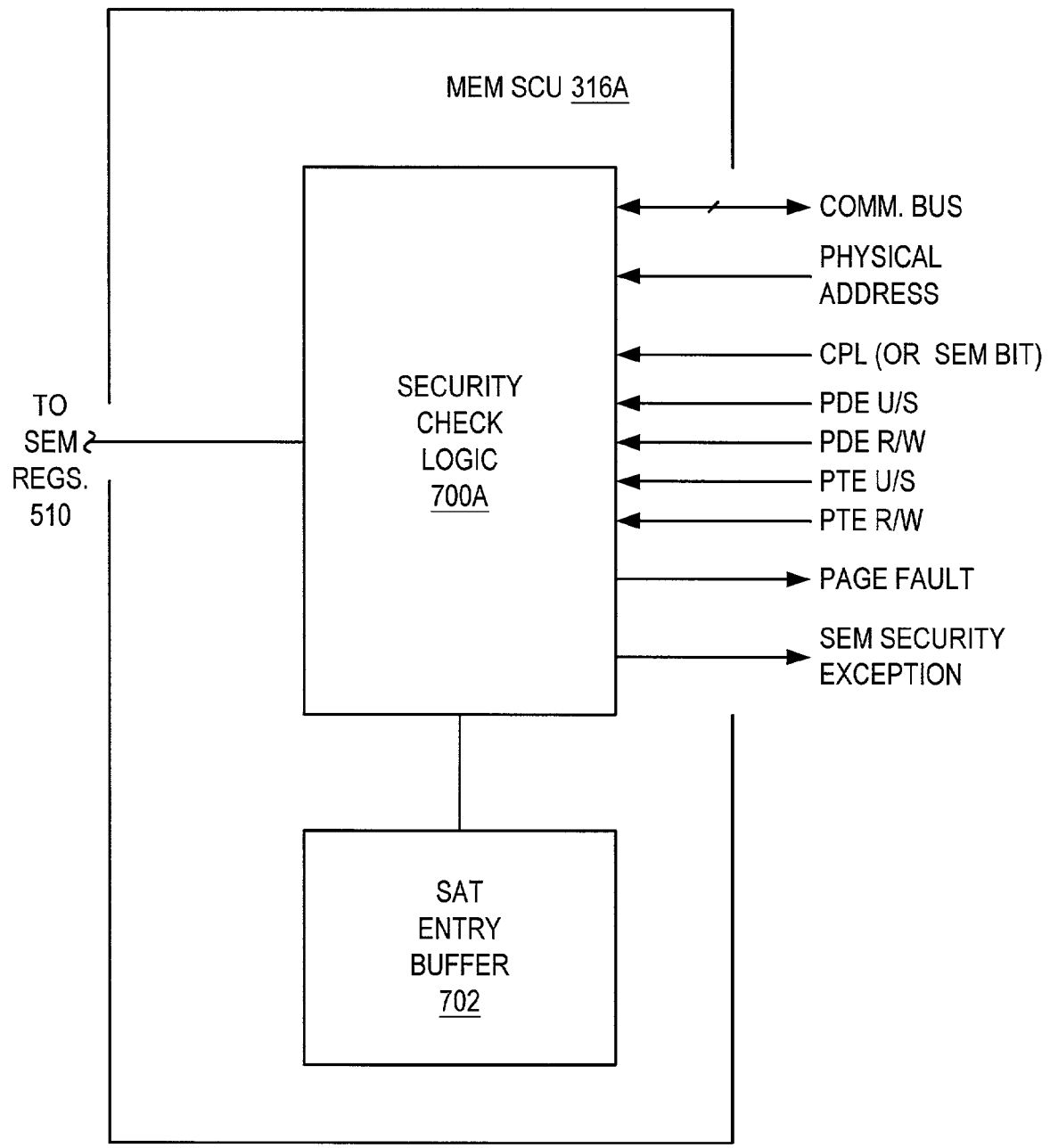

FIG. 7A is a diagram of one embodiment of the MEM SCU 316. In the embodiment of FIG. 7A, the MEM SCU 316 includes security check logic 700A coupled to the set of SEM registers 510 and a security attribute table (SAT) entry buffer 702. The SAT entries may include additional security information above the U/S and R/W bits of page directory and page table entries corresponding to memory pages. Security check logic 700A uses the additional security information stored within a given SAT entry to prevent unauthorized software-initiated accesses to the corresponding memory page. SAT entry buffer 702 is used to store a relatively small number of SAT entries of recently accessed memory pages.

As described above, the set of SEM registers 510 may be used to implement the SEM within the computer system 300. The contents of the set of SEM registers 510 govern the operation of the MEM SCU 316A. The security check logic 700A receives information to be stored in SAT entry buffer 702 from the MMU 502 via a communication bus, as indicated in FIG. 7A. The security check logic 700A also receives a physical address produced by the paging unit 602.

As shown, the security check logic 700A is coupled to a communication bus and to the SEM registers 510. The check logic 700A may generate a page fault notification signal and an SEM security exception notification signal.

Figure 7B:
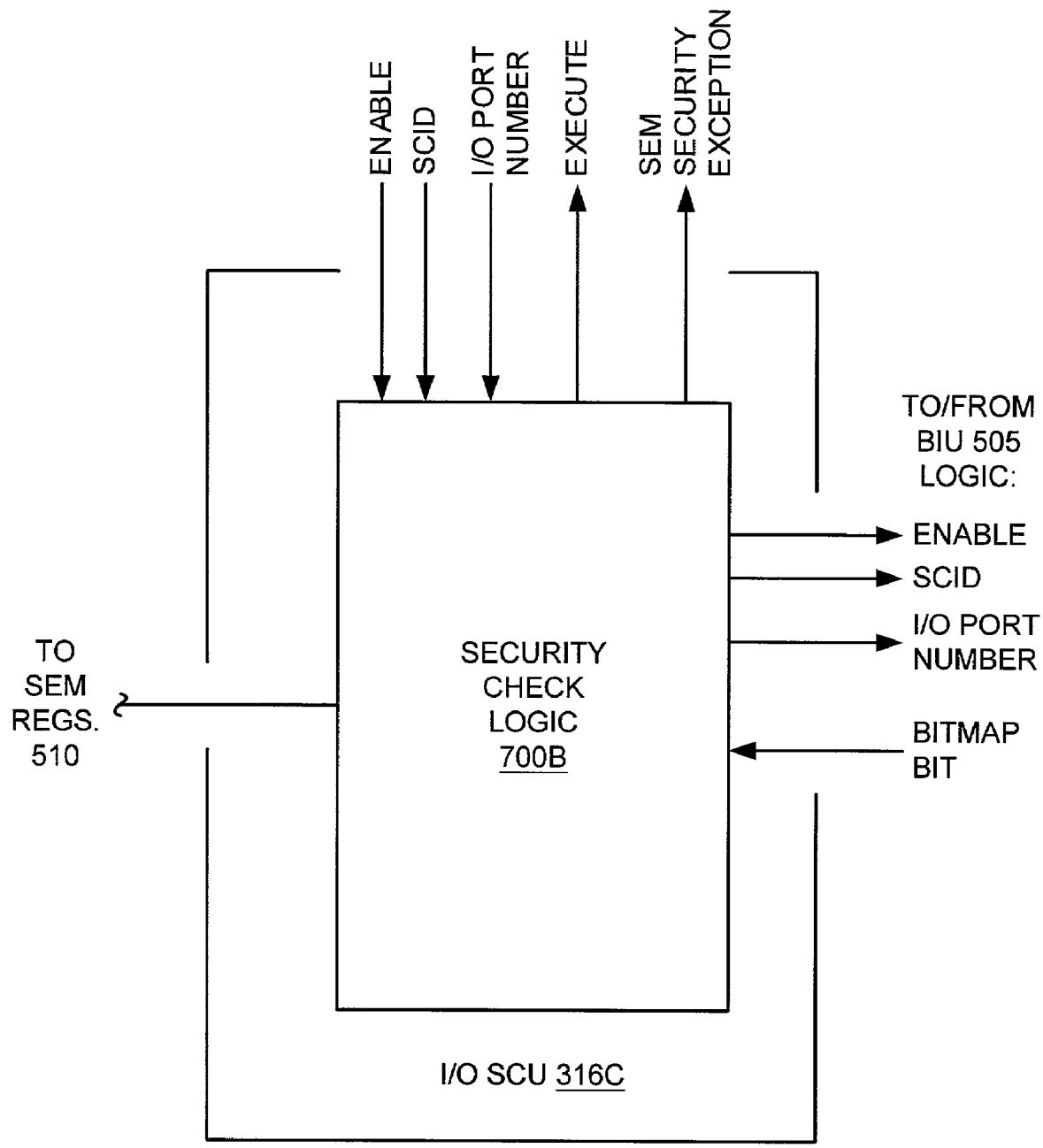
FIG. 7B is a diagram of one embodiment of an I/O SCU, according to one aspect of the present invention.

FIG. 7B is a diagram illustrating one embodiment of the I/O SCU 316C. In the embodiment of FIG. 7B, the I/O SCU 316C includes security check logic 700B. The security check logic 700B receives an "ENABLE" signal and an I/O port number from the execution unit 500, and a SCID value from the MMU 502. The execution unit 500 may assert the ENABLE signal prior to executing an I/O instruction that accesses a "target" I/O port in the I/O address space. The I/O port number is the number of the target I/O port. The SCID value indicates a security context level of the memory page including the I/O instruction.

When the computer system 300 operates in the SEM, the security kernel 404 may also generate and maintain the SEM I/O permission bitmap 800 in the memory 306. When the execution unit 500 executes an I/O instruction of a task, logic within the CPU 302 may first compare a current privilege level (CPL) of the task to an I/O privilege level (IOPL). If the CPL of the task is at least as privileged as (i.e., is numerically less than or equal to) the IOPL, the logic within the CPU 302 may check the SEM I/O permission bitmap 800. If, on the other hand, the CPL of the task is not as privileged as (i.e., is numerically greater than) the IOPL, then the execution unit 500 will not execute the I/O instruction. In one embodiment, a general protection fault (GPF) will then occur.

When the execution unit 500 asserts the ENABLE signal, the security check logic 700B provides the ENABLE signal, the received SCID value, and the received I/O port number to logic within the BIU 505. The logic within the BIU 505 uses the SCID value and the received I/O port number to access the SEM I/O permission bitmap 800, and provides the corresponding bit from the SEM I/O permission bitmap 800 to the security check logic 700B. If the corresponding bit from the SEM I/O permission bitmap 800 is cleared to '0', the security check logic 700B may assert an output "EXECUTE" signal provided to the execution unit 500. In response to the asserted EXECUTE signals, the execution unit 500 may execute the I/O instruction. If, on the other hand, the corresponding bit is set to '1,' the security check logic 700B may assert an output "SEM SECURITY EXCEPTION" signal provided to the execution unit 500. In response to the asserted SEM SECURITY EXCEPTION signal, the execution unit 500 may not execute the I/O instruction, and may instead execute the SEM security exception handler.

When the I/O instruction attempts to access a 16-bit word I/O port, or 32-bit double word I/O port, the execution unit 500 may provide the multiple byte I/O port numbers to the security check logic 700B in succession. If the security check logic 700B asserts the EXECUTE signal for each of the byte I/O port numbers, the execution unit 500 may execute the I/O instruction. If, on the other hand, the security check logic 700B asserts the SEM SECURITY EXCEPTION for one or more of the byte I/O port numbers, the execution unit 500 may not execute the I/O instruction, and may instead execute the SEM security exception handler.

Figure 8:
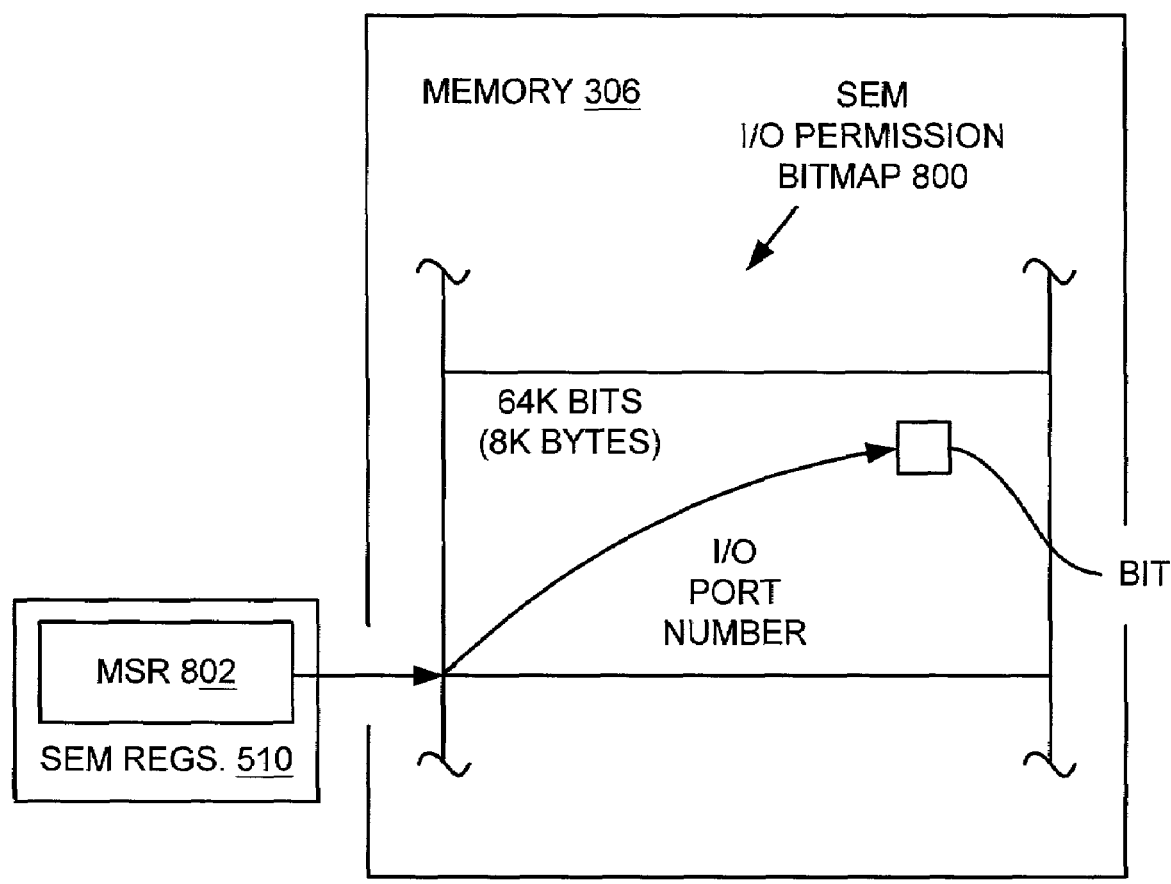
FIG. 8 is a diagram illustrating one embodiment of a secure execution mode (SEM) I/O permission bitmap stored within a memory, and one embodiment of a mechanism for accessing the SEM I/O permission bitmap, according to various aspects of the present invention.

FIG. 8 is a diagram illustrating one embodiment of the SEM I/O permission bitmap 800 and one embodiment of a mechanism for accessing the SEM I/O permission bitmap 800. The mechanism of FIG. 8 may be embodied within the logic within the BIU 505, and may apply when the computer system 300 is operating in the SEM. In the embodiment of FIG. 8, the SEM I/O permission bitmap 800 includes a single 64 k-bit (8 k-byte) I/O permission bitmap stored within a portion of the memory 306. The I/O port number is used as a bit offset from the contents of the model specific register 802 (i.e., the base address of the secure execution mode I/O permission bitmap 800) into the I/O permission bitmap 800. The bit accessed in this manner is the bit corresponding to the I/O port defined by the I/O port number.

As described above, the computer system 300 has n different SCID values, where n is an integer and n≧1. The SEM I/O permission bitmap 800 may include a different I/O permission bitmap 800 for each of the n different SCID values. Each of the separate I/O permission bitmaps 800 may include 64 k bits, or 8 k bytes.

In other embodiments, the MSR 802 may be used to store a beginning (i.e., base) address of the SEM I/O permission bitmap 800. The SCID value of the memory page including the I/O instruction that accesses the I/O port may be used as a offset from the contents of the model specific register 802 (i.e., the base address of the SEM I/O permission bitmap 800) into the one or more 64 k-bit (8 k-byte) I/O permission bitmaps making up the SEM I/O permission bitmap 800. As a result, the I/O permission bitmap corresponding to the SCID value would be accessed. The I/O port number may then be used as a bit offset into the I/O permission bitmap corresponding to the SCID value. The bit accessed in this manner would be the bit corresponding to the I/O port defined by the I/O port number.

Figure 9:
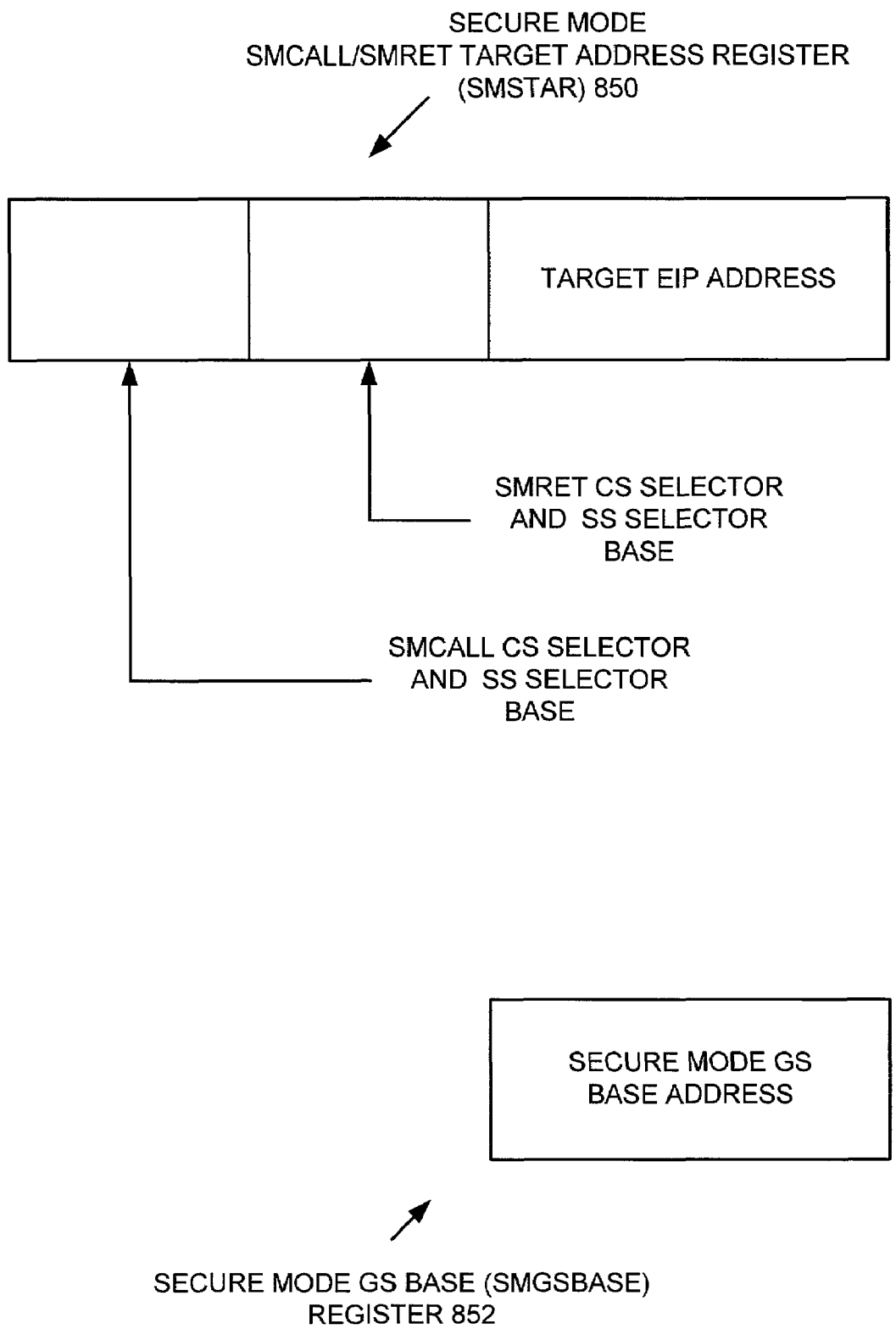
FIG. 9 is a diagram of an embodiment of a secure mode SMCALL/SMRET target address register (SMSTAR) and a secure mode GS base (SMGSBASE) register used to handle SEM security exceptions, according to one aspect of the present invention.

FIG. 9 is a diagram of a secure mode SMCALL/SMRET target address register (SMSTAR) 850 and a secure mode GS base (SMGSBASE) register 852 used to handle the SEM security exceptions. For security reasons, the SEM security exception mechanism cannot rely on the contents of any control registers or data structures accessable in normal mode to provide the addresses of the SEM security exception handler and stack when the SEM security exception occurs.

The SMSTAR register 850 includes an "SMRET CS Selector and SS Selector Base" field, an "SMCALL CS Selector and SS Selector Base" field, and a "Target EIP Address" field. The SMGSBASE register 852 includes a secure mode GS base address. The values stored in the SMSTAR register 850 and the SMGSBASE register 852 are typically set at boot time.

Figure 10:
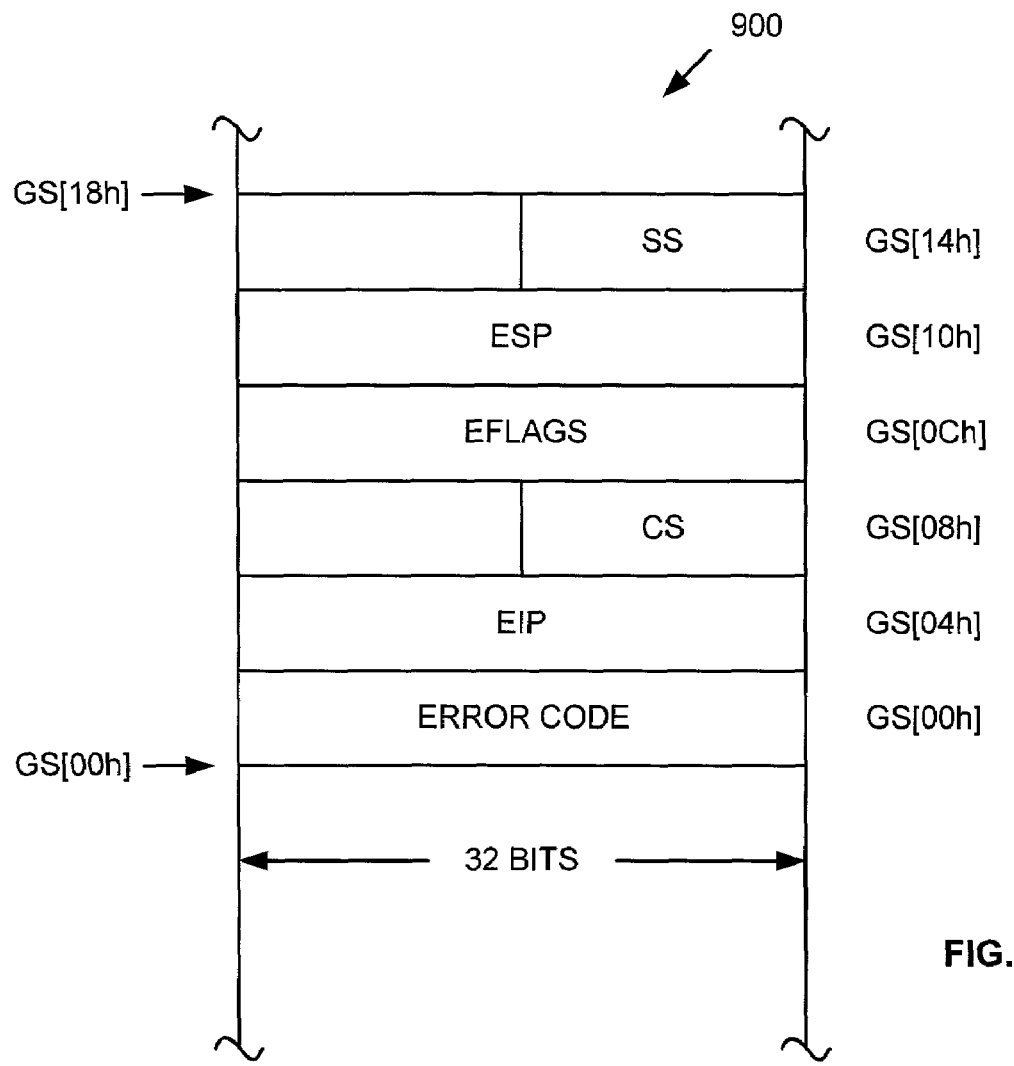
FIG. 10 is a diagram of one embodiment of an SEM security exception stack frame generated when an SEM security exception occurs, according to one aspect of the present invention.

FIG. 10 is a diagram of one embodiment of an SEM security exception stack frame 900 generated by the operating system 402 when an SEM security exception occurs. The SEM security exception stack frame 900 begins at GS[00h].

An error code resides in the SEM security exception stack frame 900 at GS[00h]. The contents of the instruction pointer (EIP) of the faulting application reside in the SEM security exception stack frame 900 at GS[04h]. The contents of the code segment (CS) register of the faulting application reside in the SEM security exception stack frame 900 at GS[08h]. The contents of the flags (EFLAGS) register of the faulting application or code segment reside in the SEM security exception stack frame 900 at GS [0Ch]. The contents of the stack pointer (ESP) register of the faulting application reside in the SEM security exception stack frame 900 at GS[10h]. The contents of the stack segment (SS) register of the faulting application reside in the SEM security exception stack frame 900 at GS[14h].

Figure 11:
FIG. 11 is a diagram of an exemplary format of the error code of the SEM security exception stack frame, according to one aspect of the present invention.

FIG. 11 is a diagram of an exemplary format 1010 of the error code of the SEM security exception stack frame 900 of FIG. 10. In the embodiment of FIG. 11, the error code format includes a write/read (W/R) bit, a user/supervisor (U/S) bit, a model specific register (MSR) bit, and a system management interrupt (SMI) bit. The write/read (W/R) bit is '1' when the SEM security exception occurred during a write operation, and is '0' when the SEM security exception occurred during a read or execute operation. The user/supervisor (U/S) bit is '1' when the secure execution mode (SEM) exception occurred in user mode (CPL=3), and is '0' when the SEM security exception occurred in supervisor mode (CPL=0).

The model specific register (MSR) bit is '1' when the SEM security exception occurred during an attempt to access a secure model specific register (MSR), and is '0' when the SEM security exception did not occur during an attempt to access a secure MSR. The system management interrupt (SMI) bit is '1' when the SEM security exception occurred during a system management interrupt (SMI), and is '0' when the SEM security exception did not occur during an SMI.

Figure 12:
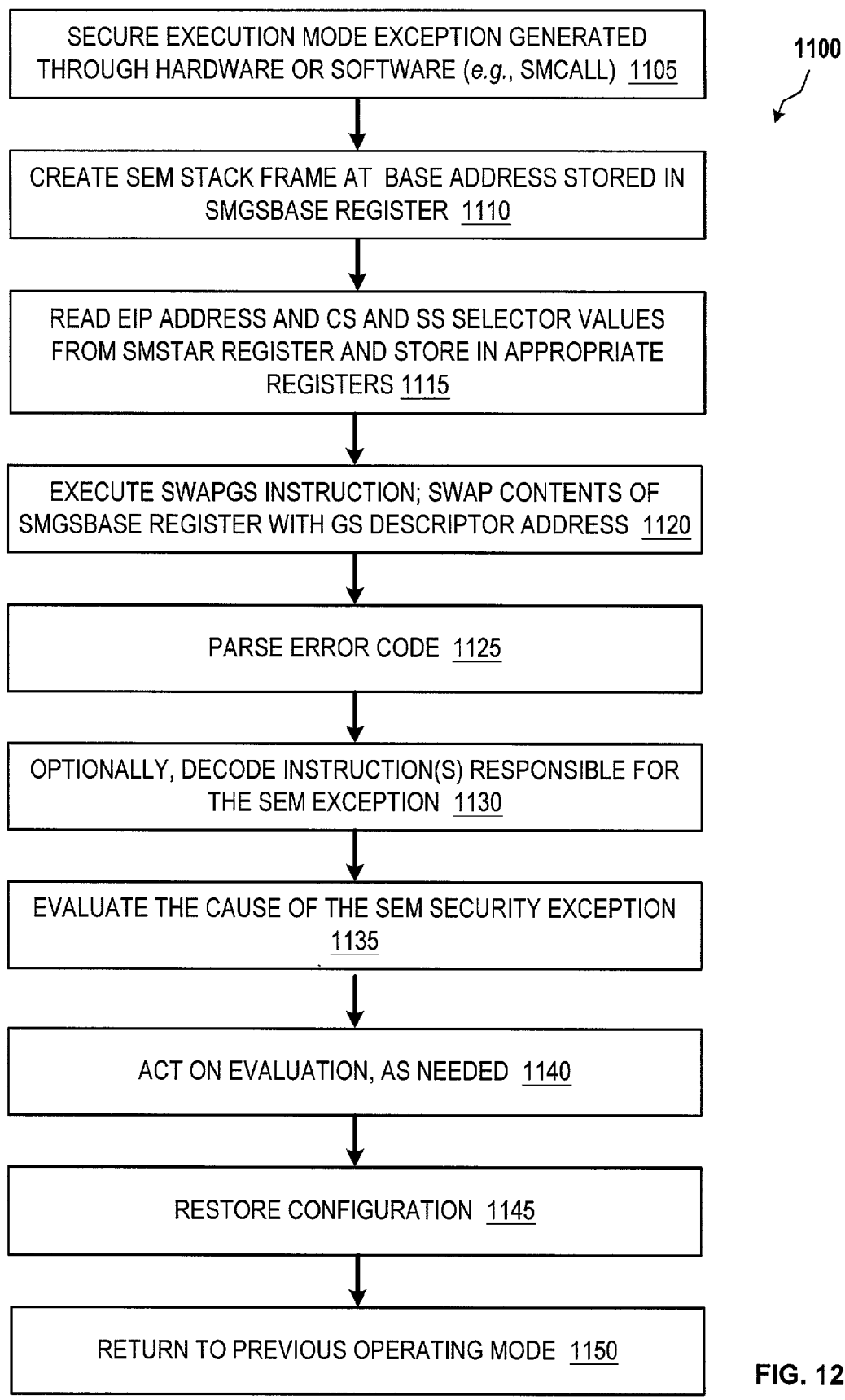
FIG. 12 illustrates a flowchart of an embodiment of a method of handling an SEM exception, according to one aspect of the present invention.

FIG. 12 illustrates a flowchart of an embodiment of a method 1100 of handling the SEM security exception, according to one aspect of the present invention. The method 1100 may include generating the SEM security exception, in block 1105, either through hardware or through software, such as through the SMCALL instruction. The method 1100 includes creating an SEM stack frame 900 at a base address plus an offset, in block 1110. The secure mode GS base address is read from the SMGSBASE register 852. The SEM stack pointer may be formed from the secure mode GS base address offset by the number of bytes in the SEM stack frame. The SEM stack frame 900 is written in memory such that the error code is at the location pointed to by the secure mode GS base address stored in the SMGSBASE register 852. The error code of the SEM security exception is generated by the SEM exception hardware. The SEM security exception itself may have be generated by the operating system 402, by device driver code 406, by application code 400, etc. The faulting code segment values are written into GS space as shown in FIG. 10.

The method 1100 next reads the target EIP address and the SMCALL CS and SS selector values from the SMSTAR register 850 and stores the target EIP address and the SMCALL CS and SS selector values in the appropriate registers, in block 1115. The target EIP address is loaded into the EIP register. The CS selector value is loaded into the CS register, and the SS selector value is loaded into the SS register. The SS selector address may be derived from the CS selector address. The target EIP address points to the first instruction I) of the SEM security exception handler code.

The method 1100 also executes a SWAPGS instruction, in block 1120. The execution of the SWAPGS instruction swaps the contents of the SMGSBASE register 902 with the base address of the GS segment descriptor cached in the CPU 402. The subsequent SEM security exception handler instructions can access the SEM security exception stack frame 900 and memory above or below the SEM security exception stack frame 900 using GS space displacement-only addressing. The GS space addressing provides secure memory for the SEM security exception handler.

The SEM security exception handler in the security kernel 404 may include several pages of virtual memory protected by security bits, such as stored in the SEM registers 510, or other security measures described herein. The SEM security exception handler may include several pages of protected physical memory protected by security bits, such as stored in the SEM registers 510, or other security measures described herein.

The method 1100 next parses the error code, in block 1120. The error code bits may be parsed one at a time, as the source of the SEM security exception is determined. Optionally, the method 1100 decodes one or more instructions that were executed or prepared for execution before the SEM security exception was generated, in block 1130. The particular instructions and their operands may provide additional information on the source of the SEM security exception. The method 1100 evaluates the SEM security exception, in block 1135, based on the error code and, possibly, the instructions prior to or after the instruction that caused the generation of the SEM security exception. The evaluation of the block 1135 may include referencing a look-up table or performing a security algorithm. The look-up table may be indexed by one or more of the error code, one or more bits of the error code, and one or more of the particular instructions and/or their operands. The security algorithm may include a code tree performed by the security kernel 404. Both the look-up table and the security algorithm will determine on the exact hardware 310, etc. and operating system 402 implemented in the computer system 300.

Once the method 1100 evaluates the SEM security exception, in block 1135, the method 1100 acts on that evaluation, as needed, in block 1140. The SEM security exception may be ignored and operations resumed. The faulting instruction or code segment may be ignored. The faulting instruction or code segment may be contained so that the faulting instruction or code segment is executed by proxy, in a virtual memory or I/O space.

The method 1100 mostly restores the computer system 300 to its pre-SEM security exception configuration, in block 1145. When the SEM security exception handler exits, another SWAPGS instruction is executed to return the secure mode base address value to its original value and an SMRET instruction is executed to return to the previous operating mode, in block 1150. When executing the SWAPGS instruction, the security kernel 404 writes values for the code segment (CS) of the faulting code to the SMRET CS Selector and SS Selector Base field of the SMSTAR register 850. The SMRET instruction may return the system 300 to normal mode. Unlike the SYSRET instruction, the SMRET instruction may leave the current privilege level (CPL) at 0, and does not set the EFLAGS.IF bit.

Note that in one embodiment, blocks 1105-1115 of the method 1100 are carried out primarily in hardware, while blocks 1120-1135 are carried out primarily in software. In another embodiment, the method 1100 is carried out primarily in software. In yet another embodiment, the method 1100 is carried out primarily in hardware. Note that in one embodiment, the EIP address is modified to avoid an instruction that may have caused the SEM security exception.

Referring back to FIG. 7A, when computer system 300 is operating in the SEM, security check logic 700A receives the CPL of the currently executing task (i.e., the currently executing instruction), along with normal control bits and one or more SEM bits 509 associated with a selected memory page within which a physical address resides. Security check logic 700A uses the above information to determine if access to that portion of the memory 306 is authorized.

The CPU 302 may be an x86 processor, and may include a code segment (CS) register, one of the 16-bit segment registers of the x86 processor architecture. Each segment register selects a 64 k block of memory, called a segment. In the protected mode with paging enabled, the CS register is loaded with a segment selector that indicates an executable segment of memory 306. The highest ordered (i.e., most significant) bits of the segment selector are used to store information indicating a segment of memory including a next instruction to be executed by the execution unit 500 of the CPU 302. An instruction pointer (IP) register is used to store an offset into the segment indicated by the CS register. The CS:IP pair indicate a segmented address of the next instruction. The two lowest ordered (i.e., least significant) bits of the CS register are used to store a value indicating the CPL of the task currently being executed by the execution unit 500 (i.e., the CPL of the current task).

The security check logic 700A of the MEM SCU 316A may produce a page fault ("PF") signal and as "SEM SECURITY EXCEPTION" signal, and provide the PF and the SEM SECURITY EXCEPTION signals to logic within the paging unit 602. When the security check logic 700A asserts the PF signal, the MMU 502 forwards the PF signal to the execution unit 500. In response to the PF signal, execution unit 500 may use the well-known interrupt descriptor table (IDT) vectoring mechanism of the x86 processor architecture to access and execute a PF handler routine.

When the security check logic 700A asserts the SEM SECURITY EXCEPTION signal, the MMU 502 forwards the SEM SECURITY EXCEPTION signal to the execution unit 500. Unlike normal processor exceptions that use the IDT vectoring mechanism of the x86 processor architecture, a different vectoring method may be used to handle SEM security exceptions. The SEM security exceptions may be dispatched through a pair of registers (e.g., MSRs) similar to the way x86 "SYSENTER" and "SYSEXIT" instructions operate. The pair of registers may be "security exception entry point" registers, and may define a branch target address for instruction execution when the SEM security exception occurs. The security exception entry point registers may define the code segment (CS), then instruction pointer (EIP, or the 64-bit version RIP), stack segment (SS), and the stack pointer (ESP, or the 64-bit version RSP) values to be used on entry to a SEM security exception handler. The execution unit 500 may push the previous SS, ESP/RSP, EFLAGS, CS, and EIP/RIP values onto a new stack to indicate where the SEM security exception occurred. In addition, the execution unit 500 may push an error code onto the stack. As noted above, the IRET instruction may not be used as the previous SS and ESP/RSP values are saved, and a stack switch is accomplished, even if a change in CPL does not occur. The return from the SEM security exception handler is via the SMRET instruction.

Some aspects of the invention as disclosed above may be implemented in hardware or software. Thus, some portions of the detailed descriptions herein are consequently presented in terms of a hardware implemented process and some portions of the detailed descriptions herein are consequently presented in terms of a software-implemented process involving symbolic representations of operations on data bits within a memory of a computing system or computing device. These descriptions and representations are the means used by those in the art to convey most effectively the substance of their work to others skilled in the art using both hardware and software. The process and operation of both require physical manipulations of physical quantities. In software, usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software-implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A system, comprising:
    one or more security check units configured to monitor requests, wherein the one or more security check units is further configured to generate a security exception in response to one or the requests;
    a plurality of secure storage locations; and
    a processor configured to:
        create a security exception stack frame within secure memory at a base address; and
        write a faulting code sequence address and one or more register values into the security exception stack frame;
    wherein the processor is further configured to execute a security kernel, wherein the security kernel is configured to:
        execute a plurality of security exception instructions.

2. The system of claim 1, wherein the security kernel is further configured to:
    receive a security exception notification.

3. The system of claim 2, wherein receive the security exception notification further comprises receive an error code.

4. The system of claim 2, wherein receive the security exception notification comprises receive a secure execution mode security exception notification.

5. The system of claim 4, wherein receive the secure execution mode security exception notification comprises receive a hardware secure execution mode security exception notification.

6. The system of claim 4, wherein receive the secure execution mode security exception notification comprises receive a software secure execution mode security exception notification.

7. The system of claim 1, wherein the processor is further configured to:
    read one or more register values from one or more secure registers;
    write a one or more register values to the secure memory; and
    transfer control to the security kernel.

8. The system of claim 1, wherein the processor is further configured to:
receive a request that results in the security exception.

9. The system of claim 1, wherein the processor is further configured to: swap an address in a security register with an address from a base memory address register.

10. The system of claim 9, wherein the processor is further configured to:
swap the address from the base memory address register with the address in the security register.

11. The system of claim 1, wherein the processor is further configured to:
return to normal mode after executing the plurality of security exception instructions.

12. The system of claim 1, wherein execute the plurality of security exception instructions comprises parse an error code to determine a cause of the security exception.

13. The system of claim 12, wherein execute the plurality of security exception instructions further comprises decode a faulting instruction to determine the cause of the security exception.

* * * * *